(12) United States Patent
Hörtrich et al.

(10) Patent No.: US 11,498,115 B2
(45) Date of Patent: Nov. 15, 2022

(54) DEVICE AND METHOD FOR BENDING WIRE FOR A MACHINE ELEMENT OF AN ELECTRIC MACHINE

(71) Applicant: GROB-WERKE GmbH & Co. KG, Mindelheim (DE)

(72) Inventors: Roland Hörtrich, Mindelheim (DE); Michael Sinner, Bad Grönenbach (DE)

(73) Assignee: GROB-WERKE GmbH & Co. KG, Mindelheim (DE)

( * ) Notice: Subject to any disclaimer, the term of this patent is extended or adjusted under 35 U.S.C. 154(b) by 0 days.

(21) Appl. No.: 17/123,560

(22) Filed: Dec. 16, 2020

(65) Prior Publication Data

US 2021/0178452 A1   Jun. 17, 2021

(30) Foreign Application Priority Data

Dec. 17, 2019   (DE) .................... 10 2019 134 785.8

(51) Int. Cl.
*B21F 1/00*   (2006.01)
(52) U.S. Cl.
CPC ................... *B21F 1/008* (2013.01)
(58) Field of Classification Search
CPC .......... B21F 1/004; B21F 1/006; B21F 1/008; H02K 15/0414; H02K 15/0421; B21D 7/12
See application file for complete search history.

(56) References Cited

U.S. PATENT DOCUMENTS

| | | | | |
|---|---|---|---|---|
| 4,450,708 A | * | 5/1984 | King | H02K 15/045 72/481.5 |
| 4,739,643 A | * | 4/1988 | Kuriyama | H02K 15/0414 29/598 |
| 8,429,947 B2 | * | 4/2013 | Akimoto | H02K 15/0421 72/383 |
| 9,610,628 B2 | * | 4/2017 | Riemeier | B25J 9/1682 |
| 9,613,750 B2 | * | 4/2017 | Watanabe | H02K 3/12 |
| 10,923,993 B2 | * | 2/2021 | Okuda | H02K 15/005 |
| 10,971,979 B2 | * | 4/2021 | Miyazaki | H02K 3/12 |
| 11,251,687 B2 | * | 2/2022 | Watanabe | H02K 15/064 |
| 2007/0180681 A1 | | 8/2007 | Kato et al. | |

(Continued)

FOREIGN PATENT DOCUMENTS

DE   102014226224 A1   6/2016
DE   102018108656 A1   10/2019

(Continued)

OTHER PUBLICATIONS

European Search Report; priority document.
German Search Report; priority document.

*Primary Examiner* — Edward T Tolan
(74) *Attorney, Agent, or Firm* — Greer, Burns & Crain, Ltd.

(57) ABSTRACT

To simplify a commissioning and parameter change in a 3D bending process of wires, a 3D bending device and a 3D bending method for bending a wire are provided. The wire is held by a first leg and a second leg and the legs are moved, via a first to third relative movement device, in a first to third relative movement with a first to third movement axis in order to change, in an adjustable manner independently of one another, torsion angles of the first and second legs and a distance between the central axes of the legs.

6 Claims, 8 Drawing Sheets

(56) References Cited

U.S. PATENT DOCUMENTS

| | | | |
|---|---|---|---|
| 2010/0252139 A1* | 10/2010 | Akimoto | H02K 15/0478 29/596 |
| 2014/0223727 A1 | 8/2014 | Watanabe et al. | |
| 2016/0181897 A1 | 6/2016 | Borrmann et al. | |
| 2018/0233995 A1 | 8/2018 | Okuda et al. | |
| 2019/0109524 A1 | 4/2019 | Watanabe et al. | |

FOREIGN PATENT DOCUMENTS

| | | |
|---|---|---|
| JP | 2016165850 A | 9/2016 |
| WO | 2019244090 A1 | 12/2019 |

* cited by examiner

DEVICE AND METHOD FOR BENDING WIRE FOR A MACHINE ELEMENT OF AN ELECTRIC MACHINE

CROSS-REFERENCES TO RELATED APPLICATIONS

This application claims the benefit of the German patent application No. 10 2019 134 785.8 filed on Dec. 17, 2019, the entire disclosures of which are incorporated herein by way of reference.

FIELD OF THE INVENTION

The invention relates to a 3D bending device for bending a wire, which is formed with a first leg, a second leg and an angled portion between the legs, into a 3-dimensional shape for the production of machine elements of electric machines. The invention further relates to a 3D bending method for bending a wire, which is formed with a first leg, a second leg and an angled portion between the legs, into a 3-dimensional shape for the production of machine elements of electric machines.

BACKGROUND OF THE INVENTION

Such a 3D bending device and such a 3D bending method are known from US 2014/0223727A1 and DE 10 2018 108 656 A1, which will be addressed in more detail below.

Electric machines are understood to be, in particular, machines for converting electric energy into kinetic energy and machines for converting kinetic energy into electric energy. In particular, this term is to be understood to mean electric motors and generators.

In order to manufacture machine elements of such electric machines, such as stators and rotors, for example, it is necessary in many cases to form electrically conductive wires, connect them with each other, to cut them or otherwise process them. In this case, the wire may, in particular, also have a rectangular cross section, be configured as a flat, rectangular or profile wire.

Most frequently, production methods permitting a particularly economical manufacture of high-performance components for electric motors are used in the production of electric motors. This includes, in particular, the hairpin method. Here, coil windings, particularly of the stator, are formed from a plurality of wire pieces whose ends are connected together. In this connection, EP 2684283B1, EP 1554794B1 and EP 1041696B1, for instance, describe devices and methods for connecting wire ends of hairpins in order to form stator windings of electric machines, in which the wire ends are welded together. The wire pieces are each provided with a first leg, a second leg and an angled portion between the legs. For example, the wire pieces, hereinafter also referred to as pins, may have a U-shaped configuration with a roof-shaped bent portion as an angled portion; a straight shape, a so-called I-pin, is also possible.

The production process of the electric motors is preceded by the production process of the individual wires, i.e., of hairpins or I-pins, in particular. The individual electrically conductive wires or wire pieces are then packed as densely as possible and welded together to form a continuous electrically conductive winding.

In the production process of the individual wires, they are pre-bent into the desired shape. This is most frequently done by several bending processes, in order to generate a roof-shaped bent portion or other desired shape of the angled portion, for example. The angled portion is often also provided with an offset bent portion whose shape, function and realization is described and shown in more detail in DE 10 2018 106 978 A1. Moreover, the roof shape or an angled section—in particular a cranked section—is formed between the legs of an I-pin. Examples of devices and methods for bending a roof shape are described and shown in DE 10 2018 106 980 A1.

Due to the fact that the components of electric machines are most frequently formed around a rotation axis of the electric machine, and a coil winding, accordingly, is to be configured in a crown-shaped or ring-shaped manner, the wires are moreover to be shaped so as to be adapted to the curvature of the respective component. So-called free-form bending or 3D bending serves this purpose, for which the devices and methods known from the above-mentioned documents US 2014/0223727A1 and DE 10 2018 108 656 A1 can be used.

The device and method according to US 2014/0223727 A1 use a forming die for this purpose. When it is bent by the forming die, the wire is shaped by means of contouring tools. As is apparent from the above consideration, the contour is adapted to the respective component. Stators of different sizes with different coil windings require differently shaped angled portions between the legs, and thus different contours for these angled portions. During the bending process using a forming die, an individual corresponding contouring tool has to be manufactured and used for each different contour to be formed.

In contrast thereto, DE 10 2018 108 656 A1 shows an improved device and an improved method in which 3D bending is carried out using a stationary and a pivotable gripper.

SUMMARY OF THE INVENTION

The invention has set itself an object of further improving a 3D bending device and a 3D bending method with respect to a simpler adaptability for different machine elements and with respect to a lower production expenditure.

According to a first aspect thereof, the invention provides a 3D bending device for bending a wire, which is formed with a first leg, a second leg and an angled portion between the legs, into a 3-dimensional shape for the production of machine elements of electric machines, comprising:

a first holding member for holding the wire by the first leg and a second holding member for holding the wire by the second leg, a first relative movement device for relatively moving the first holding member and the second holding member in a first relative movement with a first movement axis in order to produce a torsion angle of the first leg relative to an imaginary connecting line between the central axes of the legs, a second relative movement device for relatively moving the first holding member and the second holding member in a second relative movement with a second movement axis in order to produce a torsion angle of the second leg relative to the imaginary connecting line between the central axes of the legs, and a third relative movement device for moving the first holding member relative to the second holding member in a third relative movement with a third movement axis in order to change the distance between the central axes of the legs.

Preferably, the first relative movement device is a first rotating or pivoting device for rotating or pivoting the first holding member about a first rotation or pivot axis as the first movement axis.

Preferably, the third relative movement device is a linear movement device for relatively moving the first holding member and the second holding member in the direction of a first linear movement axis as the third movement axis.

Preferably, the second holding member is stationary and the first holding member is configured to be movable by means of the first to third relative movement devices.

Preferably, the second movement device is a linear movement device for moving the first holding member in the direction of a second linear movement axis as the second movement axis.

Preferably, the second relative movement device is a second rotating or pivoting device for rotating or pivoting the second holding member about a second rotation or pivot axis as the second movement axis.

Preferably, with at least one directional component, the rotation or pivot axis or axes extends/extend parallel to the central axis of the first and/or second leg during the use as intended of the associated holding member. Particularly preferably, when using the associated holding member as intended, the respective rotation or pivot axis coincides with the central axis of the first or second leg.

Preferably, with at least one directional component, the linear movement axis or axes extends/extend transversely to the central axis of the first and/or second leg during the use as intended of the associated holding member. Particularly preferably, when using the associated holding member as intended, the respective linear movement axis is perpendicular to the central axis of the associated leg.

Preferably, the first linear movement axis extends with at least one directional component perpendicularly to the second linear movement axis. In particular, the first and the second linear movement axes span a plane of movement within which the holding members are freely movable relative to one another.

Preferably, the first rotation or pivot axis extends substantially parallel to the second rotation or pivot axis.

According to another aspect, the invention relates to a 3D bending method for bending a wire, which is formed with a first leg, a second leg and an angled portion between the legs, into a 3-dimensional shape for the production of machine elements of electric machines, comprising:

a) twisting the first leg by a first torsion angle relative to an imaginary connecting line between the central axes of the first and the second leg by means of a first relative movement of the first leg and the second leg with a first movement axis, b) twisting the second leg by a second torsion angle relative to an imaginary connecting line between the central axes of the first and the second leg by means of a second relative movement of the first leg and the second leg with a second movement axis, and c) changing the distance between the central axes of the first and the second leg by means of a third relative movement of the first and the second leg with a third movement axis.

The 3D bending method preferably comprises:
holding the first leg by means of a first holding member and the second leg by means of a second holding member and carrying out the steps a), b) and c) by relatively moving the first and second holding members.

Step a) preferably comprises the step of:
a1) rotating or pivoting the first leg about a first rotation or pivot axis as the first movement axis.

Preferably, step b) comprises the step of:
b1) retaining the second leg and rotating or pivoting the first leg and displacing the position of the first leg along a second linear axis as the second movement axis.

Preferably, step b) comprises the step of:
b2) rotating or pivoting the second leg about a second rotation or pivot axis as the second movement axis.

Preferably, step c) comprises the step of:
c1) relatively moving the first and the second leg along a first linear axis as the third movement axis.

Preferably, the respective rotation or pivot axis or axes extends/extend with at least one directional component parallel to the central axis of the first and/or second leg. Particularly preferably, the respective rotation or pivot axis lies on the central axis of the associated leg.

Preferably, the respective linear movement axis or axes extends/extend with at least one directional axis transversely to the central axis of the first and/or second leg. Particularly preferably, the respective linear movement axis extends perpendicularly to the central axes of the first and the second leg.

Preferably, the first linear movement axis extends with at least one directional component perpendicularly to the second linear movement axis. Particularly preferably, the linear movement axes span a plane of movement within which a relative movement of the lugs takes place over freely selectable, adjustable curves.

Preferably, the first rotation or pivot axis extends substantially parallel to the second rotation or pivot axis.

Preferably, the steps a) to c) are carried out simultaneously or in an at least partially overlapping manner.

Preferably, the 3D bending device according to any one of the preceding embodiments further comprises a control system configured for controlling the 3D bending device in order to carry out the 3D bending method according to any one of the preceding embodiments.

According to another aspect, the invention creates a computer program or computer program product, comprising control instructions which, if uploaded into a control system of a 3D bending device according to any one of the preceding embodiments, cause the 3D bending device to carry out the 3D bending method according to any one of the preceding embodiments.

Preferred embodiments of the invention relate to a device and a method for bending coil segments.

In contrast to the prior art with the bending process using a forming die, no separate contouring tools for different shapes are required. Moreover, the influence of re-bending can by compensated by simple tests and readjustments without contouring tools having to be laboriously reworked.

Compared to the known prior art with a pivotable gripper, adjustments can be made without the preceding process of shaping the angled portion—roof-shaped bending, cranking and/or offset bending—having to be altered. In particular, a change of the distance or the offset of the legs relative to each other caused by 3D bending can be compensated or corrected in embodiments of the invention. Further advantages of preferred embodiments of the invention become apparent from the following detailed description of preferred embodiments.

BRIEF DESCRIPTION OF THE DRAWINGS

Exemplary embodiments of the invention will be explained in more detail below with reference to the attached drawings. In the drawings.

DETAILED DESCRIPTION OF THE PREFERRED EMBODIMENTS

Figure 1:
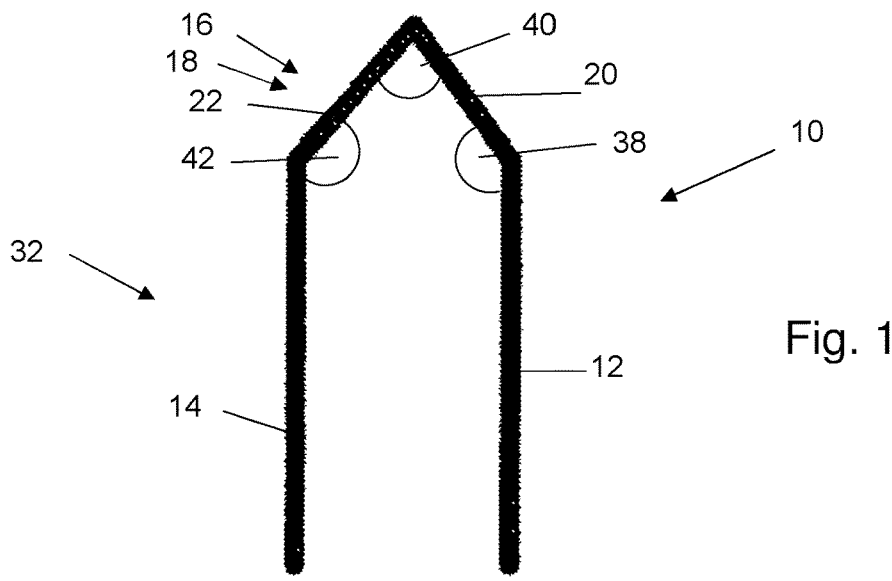
FIG. 1 shows a side view of a first embodiment of a wire to be bent in the shape of a hairpin or U-pin.
Figure 2:
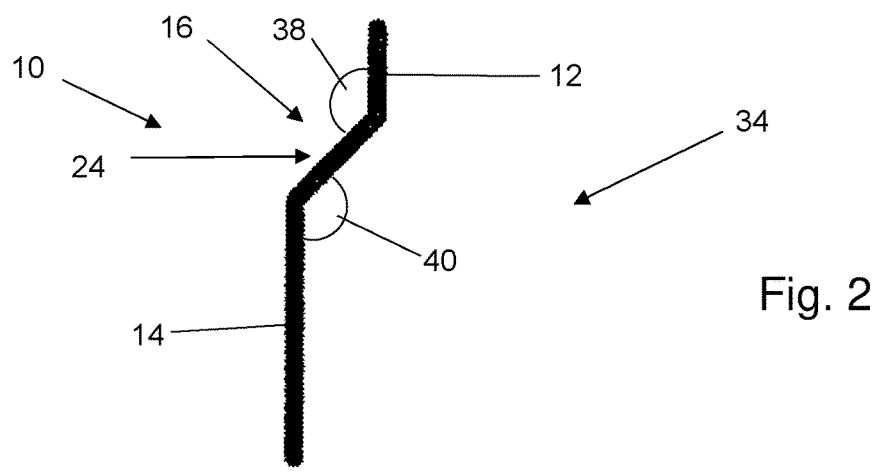
FIG. 2 shows a side view of a second embodiment of a wire to be bent in the shape of an I-pin.

FIGS. 1 and 2 show two different embodiments of a wire 10 that is to be shaped into a coil segment of a machine element of an electric machine. In the depicted embodiments, the wire 10 has a first leg 12, a second leg 14 and an angled portion 16.

In the embodiment of FIG. 1, the wire is bent in a hairpin shape or U shape, with the angled portion 16 being configured as a roof-shaped bent portion 18 with a first roof shape leg 20 and a second roof shape leg 22. The first roof shape leg 20 and the second roof shape leg 22 are angled to each other. In other embodiments not shown here in any detail, a different number of roof shape legs 20, 22 and a different number of bent portions in or on the angled portion 16 are possible. Due to the roof shape of the angled portion 16, the first leg 12 and the second leg 14 extend substantially parallel to each other with a distance s0 between them, with their extending directions, viewed along the wire 10, running in 180° opposite directions.

In the embodiment of FIG. 2, the angled portion 16 is configured as a crank 24. The legs 12, 14 extend offset from each other at the distance s0 but, in the direction along the wire 10, in the same direction. Due to the hairpin shape, the configuration of the wire 10 according to FIG. 1 is also referred to as a hairpin 32 or U-pin. Due to the straight extent of the legs 12, 14 relative to one another, the configuration according to FIG. 2 is also referred to as an I-pin 34.

Figure 5:
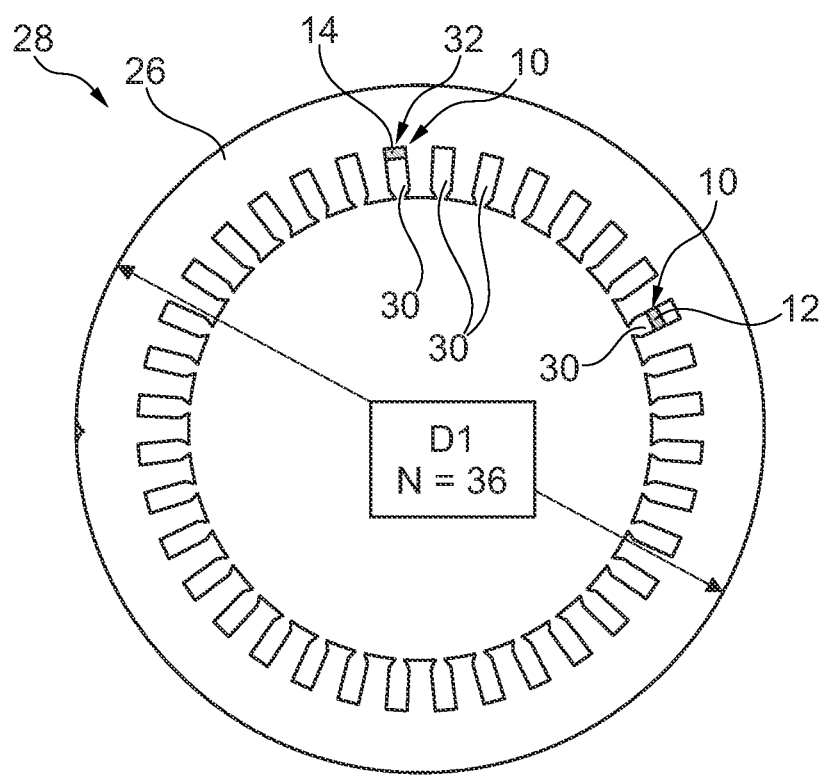
FIG. 5 is a top view, viewed in the axial direction, of a first exemplary embodiment of a stator sheet pack of a first exemplary embodiment of a stator as an example of a machine element of an electric machine, into which wires of FIGS. 1 and 4 are to be inserted in a ring-shaped arrangement.
Figure 6:
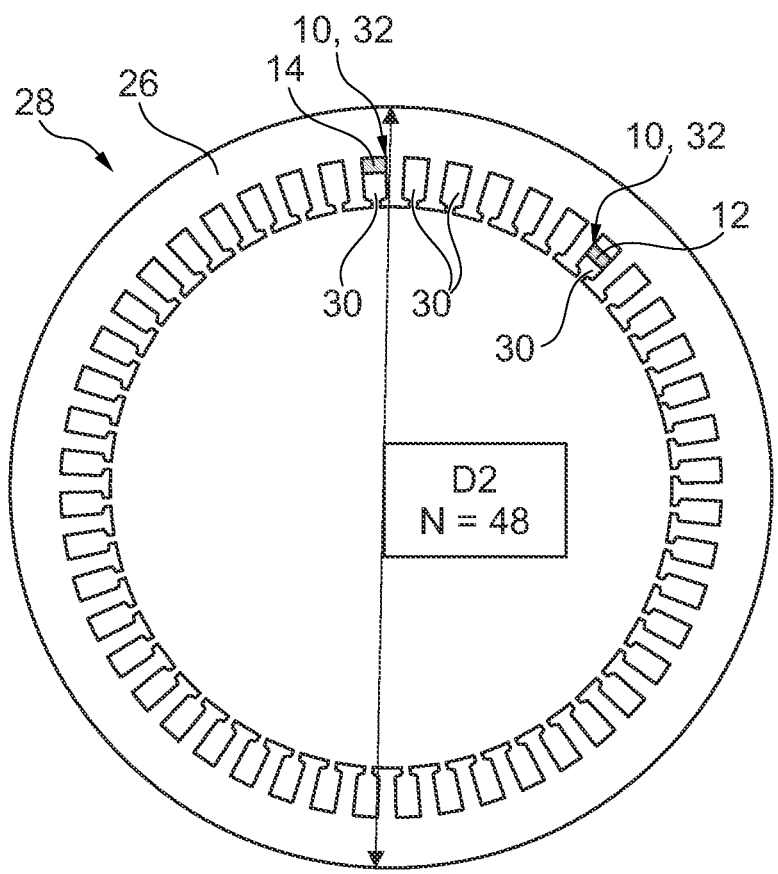
FIG. 6 is a top view, viewed in the axial direction, of a second exemplary embodiment of a stator sheet pack of a second exemplary embodiment of a stator as another example of a machine element of an electric machine, into which wires of FIGS. 1 and 4 are to be inserted in a ring-shaped arrangement.

FIGS. 5 and 6 show two exemplary embodiments of a stator sheet pack 26 for forming a stator 28 of an electric motor as an example of the machine element of the electric machine. The stator sheet pack 26 is provided with an arrangement of grooves 30, which are distributed along the circumference on its inside and into which the legs 12, 14 of the wires 10 are to be inserted as coil segments in order to thereby form coil windings, after a corresponding shaping and connecting process. Here, the roof-shaped bent portions 18 of the individual wires 10 protrude on one end of the stator sheet pack 26, the free ends of the legs 12, 14 are shaped in the circumferential direction by interlocking and then connected to legs of other wires 10 in order thus to form coil windings. In order for the wires 10 to be able to attain as high a packing density as possible and to be inserted in a fitting manner, the angled portions 16 are to be already pre-formed accordingly before the wires 10 are inserted into the stator sheet pack 26. Then, the angled portions 16, and, in particular, the roof-shaped bent portions 18, form the winding end turns of the coil windings. In this case, the I-pins of FIG. 2 may be inserted at some locations instead of the hairpins 32 of FIG. 1 in order thus to form terminals or special pins. Therefore, the I-pins should also be shaped accordingly in advance in the angled portion 16.

Figure 3:
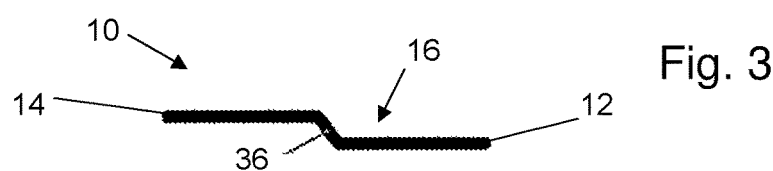
FIG. 3 shows a top view from above on to the wire of FIG. 1 or FIG. 2 to be bent, prior to 3D bending.

In FIGS. 5 and 6, the first leg 12 and the second leg 14 of a hairpin 32 are respectively inserted into corresponding grooves. For example, a total of four coil segments, i.e., four wires 10 with their respective legs 12, 14, are accommodated in each groove 30. In this case, the first leg 12 and the second leg 14 are offset from each other not only in the circumferential direction, but also with regard to their radial position. In the example of FIGS. 5 and 6, the first leg 12 is inserted at the radially outermost position; the second leg 14 is inserted in the outermost-but-one radial position in the example of FIGS. 5 and 6. In order to realize the corresponding jump in the radial position with as high a packing density as possible, an offset bent portion 36 is provided in the angled portion 16, as is illustrated in FIG. 3. FIG. 3 is a view of the respective wires 10 from FIG. 1, viewed from above in FIG. 1. For instance, the roof-shaped bent portion 18 between the two roof shape legs 20, 22 has an offset bent portion 36 in the form of the offset bend crank shown in FIG. 3.

As shown in FIG. 1, the hairpins 32 have the so-called roof-shaped bent portion 18. Accordingly, the wire 10 is bent in such a way in the angled portion 16 that it has the first leg 12 and the second leg 14, which extend substantially parallel to each other and are connected on one side by a roof-shaped portion of the wire 10. The hairpin 32 shown in FIG. 1 has several angles 38, 40, 42 resulting in the roof shape, which is also referred to as a house roof shape. In this case, the angles 38, 40, 42 and the leg lengths—both of the legs 12, 14 and of the roof shape legs 20, 22—may vary depending on the required shape. The variation may also vary amongst the wires 10 of the coil winding of the stator 28. It is also necessary, depending on the requirements, to manufacture wires 10 with different wire cross sections, or to process the wires with different cross sections.

The roof-shaped bent portion shown in FIG. 1 is obtained by means of two-dimensional bending (hereinafter referred to as 2D bending), as it is described and illustrated in more detail in DE10 2018 106 980 A1. Express reference is made to this document with respect to further details regarding the bending of the roof shape or the roof-shaped bent portion 18. The realization of the offset bent portion 36 shown in FIG. 3 is described and illustrated in detail in DE10 2018 106 978 A1, so that reference is made to this documents for further details regarding the offset bent portion 36.

Figure 4:
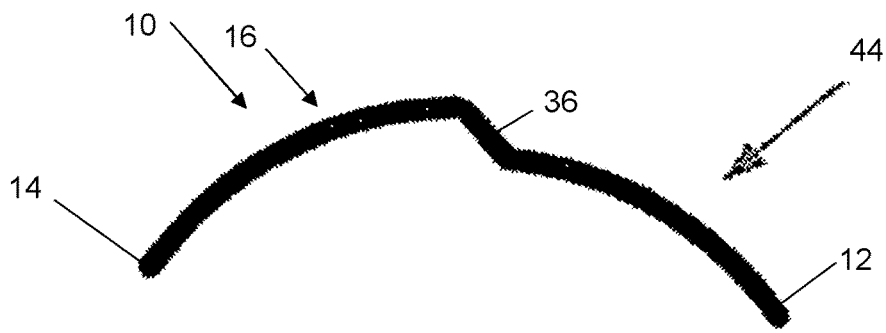
FIG. 4 shows a top view from above on to the wire of FIG. 1 or FIG. 2, after 3D bending.

As is also shown in FIGS. 5 and 6, the stator sheet pack 26 has, between the grooves 30 into which the first leg 12 and the second leg 14 are to be inserted, an arcuate shape to which the angled portion 16 has to be adapted in an appropriately arcuate manner in order to be able to attain a correspondingly high packing density of the roof-shaped bent portions 18 and thus permit a compact structure of the stator 28. Furthermore, as shown in FIGS. 5 and 6, the grooves 30 into which the first leg 12 and the second leg 14 are to be inserted are angled with respect to each other as regards their orientation, so that the first leg 12 and the second leg 14 should have a corresponding angle to each other. This angle is also to be obtained by shaping the roof-shaped bent portion 18 accordingly. For this purpose, the wire 10, having been shaped by 2D bending into one of the shapes shown in FIGS. 1 and 2 and bent into the shape with an offset bent portion 36 shown in FIG. 3, will be bent accordingly in three dimensions so as to result in a free form shown in FIG. 4. FIG. 4 shows a view comparable to FIG. 3, of the wire 10 from above in FIG. 1 subsequent to the free-form bending process. The free-form bending process is carried out by 3D bending 44.

Exemplary embodiments of a 3D bending device for carrying out such a 3D bending 44 and a 3D bending method for carrying out the 3D bending 44 are to be explained below with reference to the FIGS. 5-10.

Figure 7:
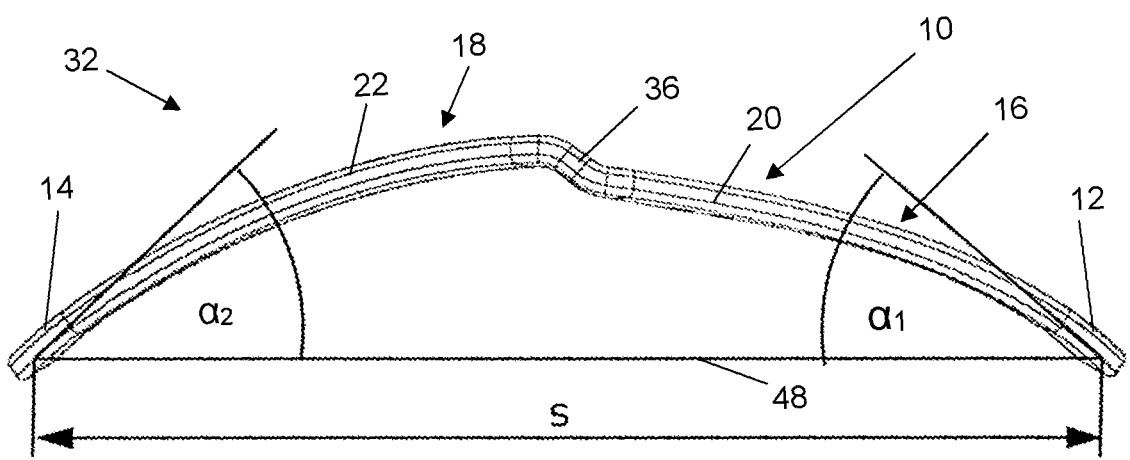
FIG. 7 is a top view of a bent wire subsequent to 3D bending, comparable with FIG. 4, for illustrating desired parameters to be attained by the bending process.
Figure 8:
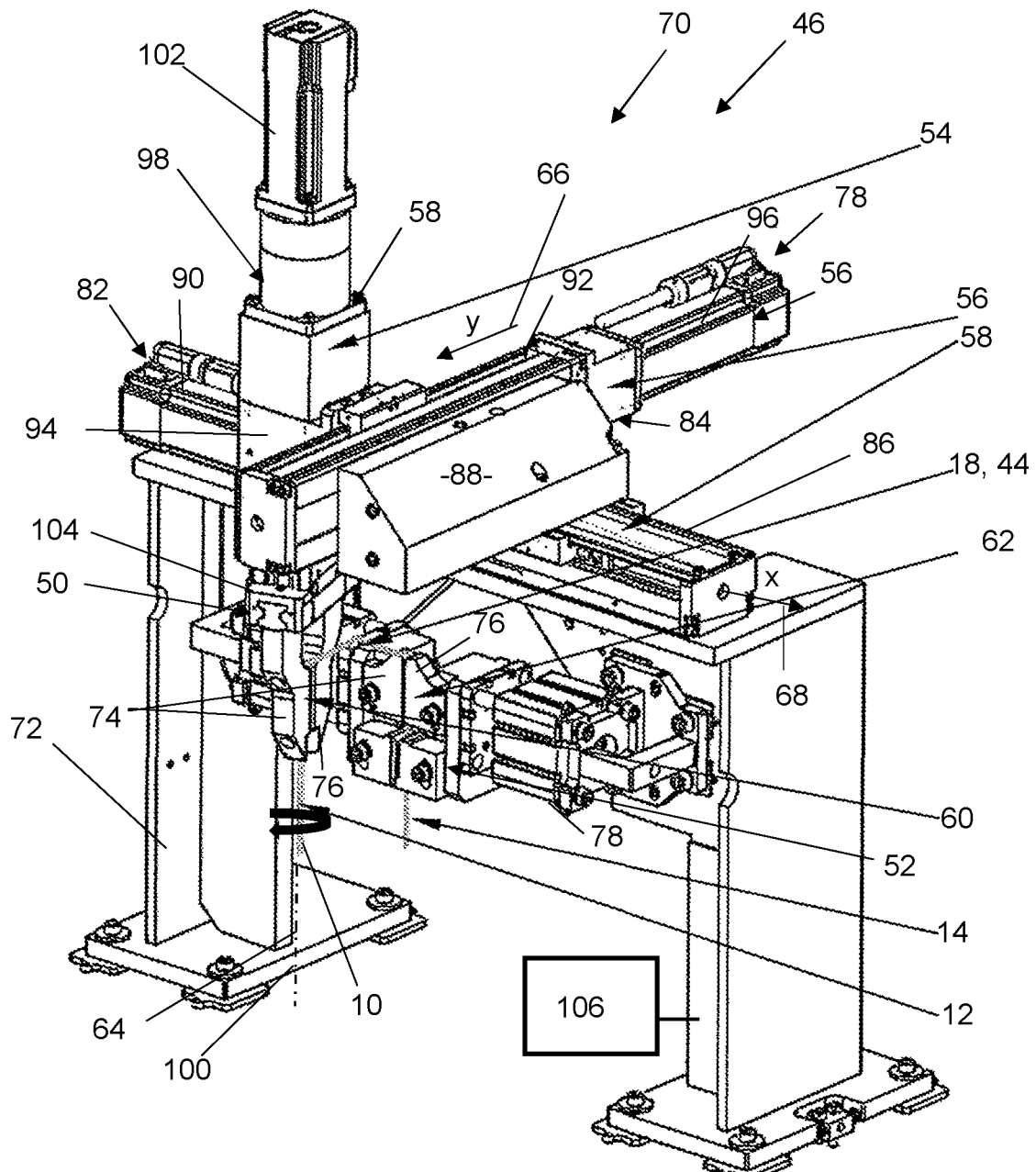
FIG. 8 shows a perspective view of a first exemplary embodiment of a 3D bending device for carrying out the 3D bending process on the wire according to FIGS. 1 to 4 and 7, wherein the first exemplary embodiment has a stationary gripper and a movable gripper.
Figure 9:
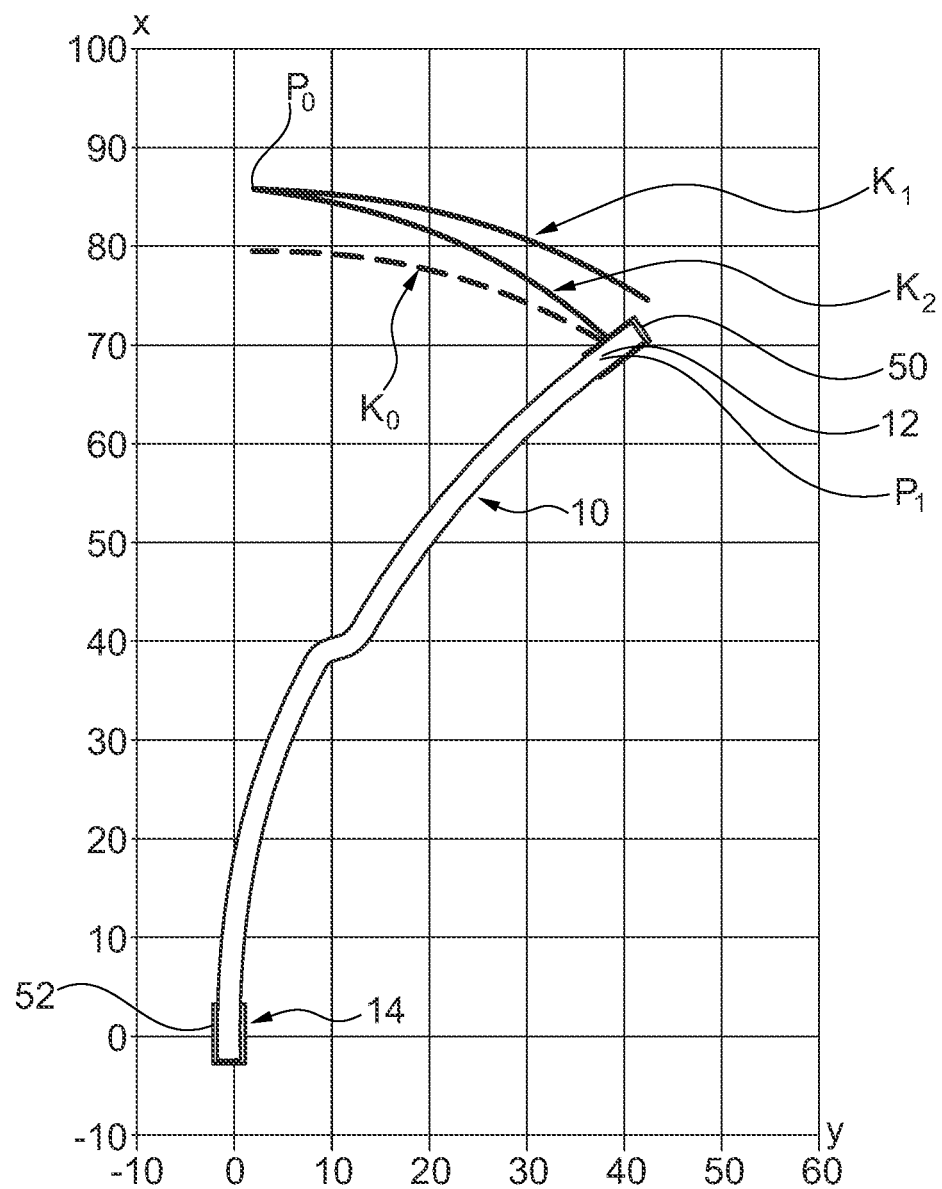
FIG. 9 shows a graph with the wire from FIGS. 4 and 7 and trajectories for illustrating the adjustment and programming of the movement of the movable gripper of the 3D bending device from FIG. 8.
Figure 10:
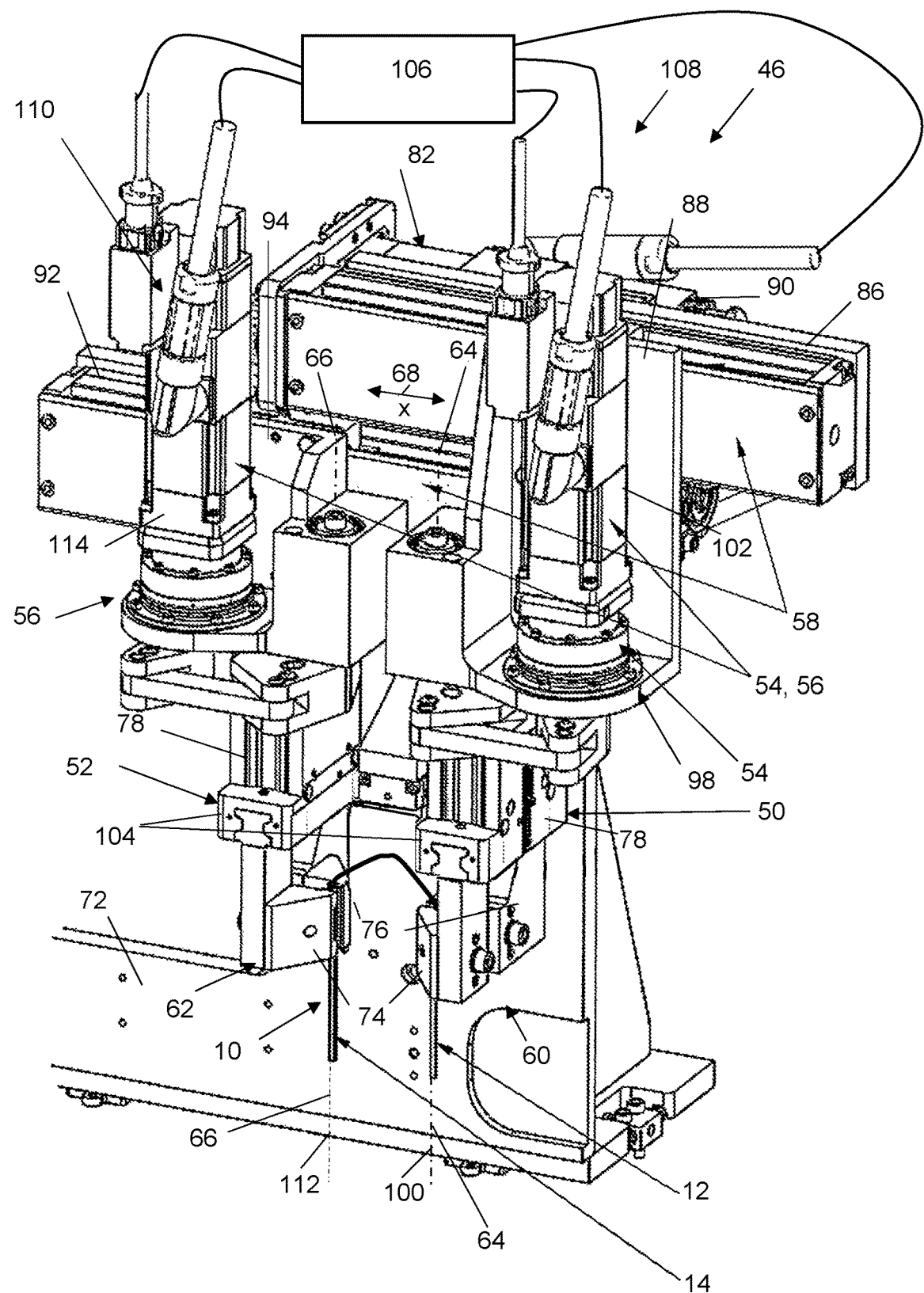
FIG. 10 shows a perspective view of a second exemplary embodiment of a 3D bending device for carrying out the 3D bending process on the wire according to FIGS. 1 to 4 and 7, wherein the second exemplary embodiment has a first movable gripper and a second movable gripper.

Here, FIG. 7 shows a wire 10, which has already been bent by 3D bending, in the shape of a hairpin 32, viewed from above on to the roof-shaped bent portion 18 (comparable to FIG. 4). FIG. 8 shows a first embodiment of the 3D bending device 46. FIG. 9 shows a graph for illustrating the adjustment of the first embodiment of the 3D bending device 46. FIG. 10 shows a second embodiment of the 3D bending device 46.

FIGS. 5 and 6 show different embodiments for the stator 28 in which the stator sheet pack 26 has different diameters D1, D2 and a different number N of grooves 30. For example, the stator sheet pack 26 of FIG. 5 has a diameter D1 of 170 mm and N=36 grooves 30, whereas the stator sheet pack 26 of FIG. 6 has a diameter D2 of 220 mm and N=48 grooves 30. Of course, these are merely exemplary values; totally different dimensions or totally different numbers N of grooves 30 may be provided. However, as the example of the inserted legs 12, 14 in different stators 28 of FIGS. 5 and 6 shows, there are different positions of the legs 12, 14 of the hairpins 32 in the two stators as well as different torsion angles of the legs 12, 14 relative to each other. The distance s of the legs 12, 14 may also be different.

3D bending 44 has to be carried out in such a way that the desired parameters $\alpha 1$, $\alpha 2$, s for inserting the legs 12, 14 into the grooves 30 in a manner fitting the respective stator 28 are obtained.

As shown in FIG. 7, a first torsion angle $\alpha 1$ of the first leg 12 relative to an imaginary connecting line 48 between the central axes of the legs 12, 14 must therefore be set by 3D bending. Moreover, a second torsion angle $\alpha 2$ of the second leg 14 to the imaginary connecting line 48 has to be set. After 3D bending, the distance between the central axes of the legs 12, 14—along the imaginary connecting line 48—is supposed to match a predetermined distance s. The wire 10 has already undergone two bending processes prior to 3D bending 44, i.e., the previously mentioned bending of the roof-shaped bent portion and the bending of the offset bent portion.

The following parameters can be altered as independently of one another as possible by means of the 3D bending device 46:
  leg angle or torsion angle $\alpha 1$ of the first leg
  leg angle or torsion angle $\alpha 2$ of the second leg
  distance of the legs s subsequent to bending or the difference s−s0 prior and subsequent to bending
  development of the roof shape or shape of the roof-shaped bent portion 18.

The development of the roof shape may include, for example, the shape of the curvature (see FIG. 4) and/or the height of the roof-shaped bent portion 18 and/or the size of the angles 38, 40, 42 of the roof-shaped bent portion 18.

In the embodiment of the 3D bending device 46 shown in FIG. 8, one of the legs 12, 14, e.g., the second leg 14, is fixed. Such an embodiment is advantageous particularly in such production plants for stators 28 in which, for the series production of stators 28 (series plants), one of the legs 12, 14 is held by the transport system. Thus, a permanent transfer location and/or a permanent position of the leg to be fixed 14 is advantageous. For example, a series plant is provided in which one of the legs 14 is held by the transport system (not shown) and therefore cannot be moved. It is therefore provided, in this embodiment of FIG. 8 of the 3D bending device 46, that 3D bending can take place only by moving the free other leg 12. FIG. 10 shows an embodiment of the 3D bending device 46 in which both the first leg 12 and the second leg 14 are moved during 3D bending 44.

Both embodiments of the 3D bending device 46 serve for bending the wire 10 into a three-dimensional shape and comprise a first holding member 50, a second holding member 52 and at least one first to third relative movement device 54, 56, 58.

The holding members 50, 52 each preferably comprise one gripper 60, 62. The first holding member 50 can grasp the first leg 12 with the first gripper 60 and is therefore configured for holding the wire 10 by the first leg 12. The second holding member 52 can grasp the second leg 14 with the second gripper 62 and is therefore configured for holding the wire 10 by the second leg 14.

The first holding member 50 and the second holding member 52 can be moved by means of the first relative movement device 54 in a first relative movement with a first movement axis 64 in order thus to twist the first leg 12 relative to the imaginary connecting line 48 and therefore set the first torsion angle $\alpha 1$ as the torsion angle of the first leg 12.

Accordingly, the second relative movement device 56 permits a relative movement of the first holding member 50 and the second holding member 52 with a second movement axis 66 such that the second leg 14 is twisted relative to the imaginary connecting line 48 in order thus to set the second torsion angle $\alpha 2$ as the torsion angle of the second leg 14.

However, the 3D bending device 46 also has a third relative movement device 58 by means of which the first holding member 50 and the second holding member 52 can be moved relative to each other with a third movement axis 68 in such a way that the distance s between the central axes of the legs 12, 14, which is to be obtained in the final state of 3D bending 44, can be set independently of the torsion angles $\alpha 1$, $\alpha 2$. In contrast to the known device shown in FIG. 11, in which there is a pivoting process about two axes lying vertically in space, the legs 12, 14 of the wire 10 are twisted in a defined manner in the 3D bending device 46 according to FIGS. 8 and 10, so that a defined torsion angle $\alpha1$ and $\alpha2$ between the leg and the secant—imaginary connecting line 48—of the wire 10, in particular of the hairpin 32, is produced. At the same time, the distance s of the leg axes can be defined. Additionally, the configuration of the roof-shaped bent portion 18 or of the angled portion 16 can be determined by a process of changing the distance by bending.

In the 3D bending device 46, it is provided that the legs 12, 14 can be moved relative to each other with three degrees of freedom—first to third movement axes 64, 66, 68, so that the distance s of the legs 12, 14 at the end of 3D bending 44 can be determined independently of the leg angles $\alpha1$, $\alpha2$.

The first and second relative movement devices 54, 56 are configured in such a way that the twisting about one leg 12, 14 is preferably carried out about the central wire axis in each case. In this manner, a rotary movement of the leg 12, 14 does not result in a change of the distance s of the legs 12, 14.

Two embodiments of the 3D bending device 46 are shown in FIGS. 8 and 10. In the embodiment according to FIG. 10, the two legs 12, 14 are each twisted around one axis and can be positioned at a distance—third axis. In the embodiment according to FIG. 8, one leg 14 stays fixed, and the other leg 12 is positioned in two axes and twisted around a third axis. This embodiment is particularly suitable for a series plant with a transport of the hairpins or other wires 10 by means of a transport system.

The 3D bending device 46 shown in FIG. 8 is configured as a bending unit 70 for 3D bending 44 with a stationary leg 14. The 3D bending device 46 has a machine bed or machine frame 72 to which the second holding member 52 is attached and thus immovable. The second gripper 62, which is immovable in the position and is thus a stationary gripper, is located on the second holding member 52.

The first and the second gripper 60, 62 each have gripper jaws 74, 76 that can be moved towards and away from each other and one or several actuators 78 for moving the gripper jaws 74, 76 towards each other and moving the gripper jaws 74, 76 away from each other.

In the second gripper 62, which is configured as a stationary gripper in FIG. 8, the gripper jaws 74, 76 can thus be brought into a holding position in which the second leg 14 is held in a preset position during the entire 3D bending process.

The bending unit 70 with a fixed leg 14 further comprises a cross slide 80 with a first linear movement device 82 for moving the first holding member 50 in the direction of a first linear movement axis x and a second linear movement device 84 for moving the first holding member 50 in the direction of a second linear movement axis y.

The first linear movement device 82 has a first guiding device 86 directed in the x-direction for guiding a first slide member 88 and a first linear movement actuator 90 for driving the movement of the first slide member 88 in the direction of the first linear movement axis x.

The second linear movement device 84 has a second guiding device 92 on the first slide device 88, which is directed in the y-direction, for guiding a second slide member 94, and a second linear movement actuator 96 for driving this movement of the second slide member in the direction of the second linear movement axis y.

A first rotating or pivoting device 98 for rotating or pivoting the first holding member 50 about a first rotation or pivot axis 100 is disposed on the second slide member 94.

This first rotating or pivoting device 98 has a first rotary actuator 102 for driving the rotary movement of the first holding member 50.

The first holding member 50 has a corresponding rotatable base member 104 on which the actuator 78 and the gripper jaws 74, 76 of the first gripper 60 are disposed. Accordingly, the base member 104 has a push guide for the gripper jaws 74, 76. The first leg 12 of the wire can be held between the gripper jaws 74, 76 of the second gripper 62 in the holding position. In this case, the first gripper 62 is configured in such a manner that the first leg 12 is held such that its central axis lies on the first rotation or pivot axis 100.

Moreover, the 3D bending device 46 has a control system 106 by means of which the actuators 78, 90, 96, 102 can be controlled based on computer software stored therein or uploaded into it. Control takes place in such a manner that the first torsion angle $\alpha1$ of the first leg is set by means of the first rotating or pivoting device 98, while both the second torsion angle $\alpha2$ of the second leg 14 and the distance s between the legs 12, 14 is set by means of the first holding member 50 via the cross slide 80 through a movement in the direction of the first linear movement axis x and in the direction of the second linear movement axis y in accordance with a previously calculated and thus predetermined trajectory K2.

Thus, the first relative movement device 54 is formed by the first rotating or pivoting device 98. The second relative movement device 56 utilizes, with a greater proportion, the movement in the direction of the second linear movement axis y and is thus primarily formed by the second linear movement device 84. The third relative movement device 58 is made possible by providing the third movement axis 78, and thus by providing the movement in the direction of the first linear movement axis x. Therefore, the third relative movement device 58 is substantially formed by the first linear movement device 82.

Since every point can be reached in two dimensions in the x-y-plane by means of the cross slide 80 and thus, arbitrary curves can also be traversed within the x-y-plane, the actual orientation of the first linear movement axis x and the second linear movement axis y is arbitrary as long as they span a plane, i.e., do not extend parallel or in a coinciding manner According to this embodiment of the 3D bending device 46, the only important point for realizing these relative movement devices 54, 56, 58 is that three degrees of freedom for movement in the x-y-plane and for rotation or pivoting about a z-axis, which is preferably perpendicular thereto—first rotation axis 100—are provided accordingly. In one variant, for example, the cross slide 80, which operates in the x-y-plane of movement in accordance with the Cartesian coordinate system, may be replaced with any other mechanism for traversing a freely adjustable curve in the x-y-plane, e.g., with a linear movement mechanism, which is rotated about a primary rotation axis on the machine frame and which therefore operates in accordance with the cylindrical coordinate system.

The first gripper 60 is formed in such a way that the wire 100 is clamped in such a way that the central axis of the movable first leg 12 lies in the rotation axis 100 of the gripper 60. Alternatively, the bending method may also be adapted, and an offset central axis of the wire 10 to the torsion axis 100 may compensated in this manner.

The 3D bending method for 3D bending with a stationary leg 14 to be carried out on the bending unit 70 according to FIG. 8 is explained below with reference to the illustration in FIG. 9.

FIG. 9 shows a top view onto the x-y-plane with units in the x and y-directions in millimeters. The zero point selected is in this case the central axis of the second leg 14 acting as the stationary leg. The central axis is fixed in position by holding the second leg 14 by means of the second gripper 62.

In the initial state, the first leg 12 is located at the position P0, which is defined by the original distance s0 between the legs 12, 14 after the processes of forming the roof-shaped bent portion and the offset bent portion. The curve K0 indicates the radius with the distance s0 of the legs 12, 14 in the initial state. In this case, this refers to the center of the grippers 60, 62. For example, the distance s0 of the legs 12, 14 in the initial state is 86 mm; accordingly, a circle with a radius of 86 mm would be specified as the curve K0. As an example, it may further be presumed that 80 mm is preset as the distance s between the legs 12, 14 intended for the final state. The curve K1 has a radius with such a distance s of the legs 12, 14 in the final state.

A transitional curve between the two radii K0 and K1, which begins at the position P0 in the initial state and ends at the desired final position P1 of the first leg 12 relative to the second leg 14, is selected as the trajectory K2 of the first gripper 60 relative to the second gripper 62. This forms the curve K2 of the free-form portion, which is programmed as the trajectory for the movement of the first gripper 60 in the x-y-plane. Accordingly, this trajectory K0 is traversed by the linear movement devices 82, 84. At the same time, the torsion angle $\alpha 1$ of the first leg 12 is set by rotating the first gripper 60 about the first rotation axis 100. The torsion angle $\alpha 2$ of the second leg 14 results from the curve K2 of the free-form portion.

With these presets, the control system 106 can be programmed easily.

A second embodiment of the 3D bending device 46, which is configured as a bending unit 108 for the 3D bending with two movable legs 12, 14, is shown in FIG. 10. This embodiment of the 3D bending device 46 also comprises a machine bed or machine frame 72 on which the linear movement device 82 for relatively moving the first holding member 50 and the second holding member 52 in the direction of the first linear movement axis x is disposed. The first guiding device 86, on which the first slide member 88 is movable in the direction of the first linear movement axis x, is formed on the machine frame 72 for this purpose. Furthermore, the linear movement device 82 for relatively moving the holding members 50, 52 in the direction of the linear movement axis x comprises the second guiding device 92, which in this case, however, is also attached to the machine frame 72 and is also oriented in the x-direction, in order to also move the second slide member 94 in the direction of this first linear movement axis x.

In one embodiment, the first slide member 88 and the second slide member 94 can be moved by means of a common first linear movement actuator 90 via a transmission (not shown) which translates a driving movement of the first linear movement actuator 90 into movements in opposite directions of the slide members 88, 94. In another embodiment, the first slide member 88 can be moved by means of a first linear movement actuator 90, and the second slide member 94 can be moved by means of a second linear movement actuator 96. Opposite movements of the first holding member 50 and the second holding member 52 may be effected by the control system 106 controlling the linear movement actuators 90, 96 accordingly.

The first rotating or pivoting device 98, which permits the first holding member 50 to be rotated about the first rotation or pivot axis 100 by means of the first rotary actuator 102, is disposed on the first slide member 88. A second rotating or pivoting device 110, by means of which the second holding member 52 can be rotated or pivoted about a second rotation or pivot axis 112, is disposed on the second slide member 94. In order to drive this movement, the second rotating or pivoting device 110 includes a second rotary actuator 114.

In this embodiment, the holding members 50, 52 are configured identically or as mirror images. A guide and the actuator 78 for the respective gripper jaws 74, 76 are located on the base member 104. The first and the second gripper 60, 62 are configured in such a manner that the respective leg 12, 14 can held such that its respective central axis coincides with the respective rotation or pivot axis 100, 112. Also in this case, a compensation may alternatively be effected by means of corresponding patterns of movement if the rotation axes 100, 112 do not coincide.

The control system 106 is configured for controlling the actuators 78, 90, 96, 102, 114 and programmed such that 3D bending 44 can be carried out with at least three degrees of freedom.

In this case, the first rotating or pivoting device 98 forms the first relative movement device 54 with the first rotation or pivot axis 100 as the first movement axis 64. In this case, the second rotating or pivoting device 110 forms the second relative movement device 56 with the second rotation or pivot axis 112 as the second movement axis 66. The linear movement device 82 for relatively moving the holding members 50, 52 in the direction of the first linear movement axis x forms the third relative movement device 58 with the first linear movement axis x as the third movement axis 68.

Thus, the bending unit 108 for bending with the two movable legs 12, 14 has a first and a parallel second linear axis for a movement of the first gripper 60 and the second gripper 62 towards each other and away from each other in opposite directions, a first torsion axis—first rotation or pivot axis 100—for setting the first torsion angle $\alpha 1$ and a second torsion axis—second rotation or pivot axis 112—for setting the second torsion angle $\alpha 2$.

The 3D bending 44 using the bending unit 108 for bending by means of two movable legs 12, 14 takes place in such a way that the two rotating or pivoting devices 98, 110 pivot about the respective central axis—wire axis—of the legs 12, 14. At the same time, the slide members 88, 94 are moved relative to each other.

Instead of the slide members 88, 94, the relative movement of the holding members 50, 52 may also take place in any other possible manner of movement along the linear axes.

Thus, in the 3D movement device according to the embodiments of the invention, at least three relative movement devices 54, 56, 58 are provided in order to carry out a relative movement of the holding members 50, 52 for holding the legs 12, 14 with at least three movement axes 64, 66, 68.

Figure 11:
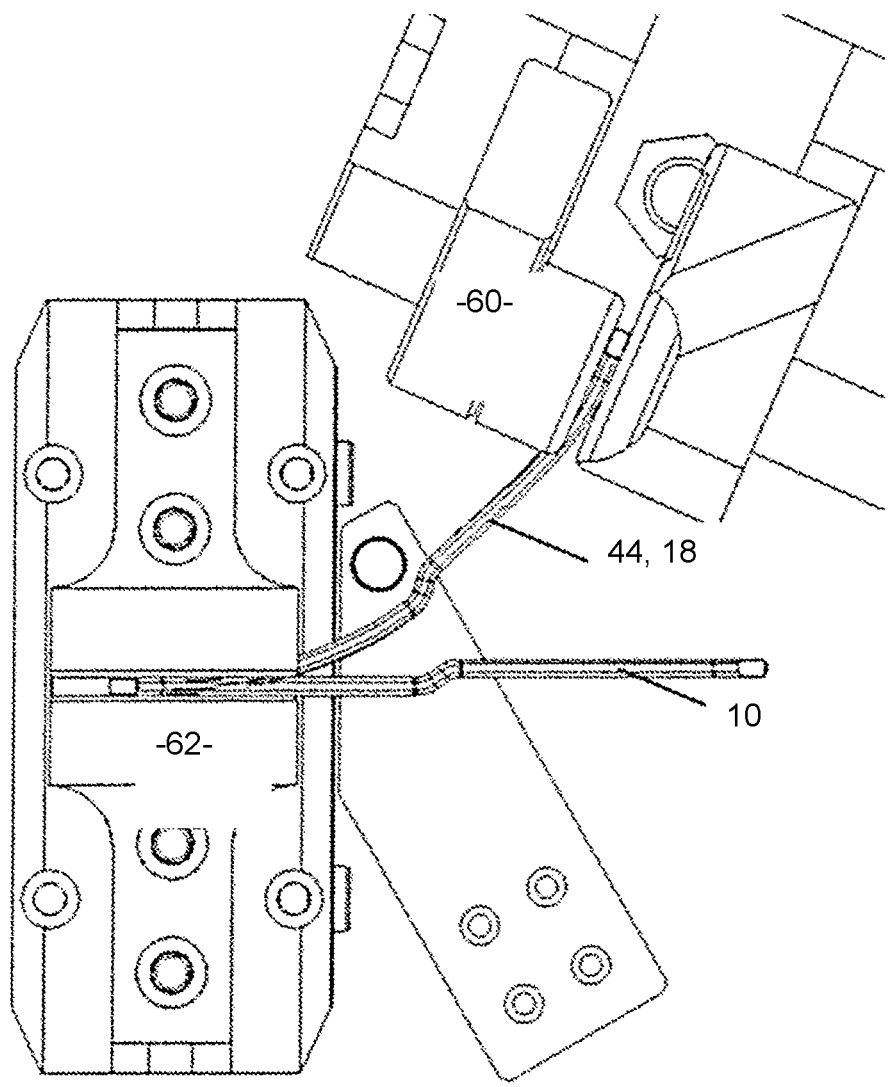
FIG. 11 is a depiction of a stationary and a movable gripper in a prior-art 3D bending device according to DE 10 2018 108 656 A1 for illustrating the differences and their effects as well as the advantages of the exemplary embodiments of the invention over the prior art.

In contrast, FIG. 11 shows the prior art of a 3D bending device used so far, with a stationary gripper 62 and a movable gripper 60 pivotable about two movement axes.

In the pivotable gripper 62, an elastic deformation of the wire to be bent can be compensated by overbending. The respective torsion angles $\alpha 1$, $\alpha 2$ to the connecting line of the legs 12, 14 result from the angular position of the first gripper 60 and the second gripper 62 relative to each other. In the prior art according to FIG. 11, a distance of the bent legs is produced in the process. Due to the stationary axes, a different distance of the legs is obtained with the same initial geometry and a change of the torsion angles. This means that if the parameters α1, α2, s of the free-form bending process are changed, the preceding 2D bending process has to be changed. In this case, the effort for determining the parameters is relatively high. Furthermore, the free form is the result of bending with the stationary axes, so that the shape of the angled portion 16 bent in free form is fixed and can be influenced only with difficulty. In the known 3D bending device, the angular position of the two grippers 60, 62 relative to each other, given the same initial situation, always results in a predefined distance of the bent legs 12, 14. The distance of the legs from each other in the non-bent and bent states and their leg angles—torsion angles α1, α2—and the change of the distance of the pivoted leg 12 results in a three-dimensional shape in the upper region of the wire. If the latter has to be changed, an additionally movable forming member has to bend the upper region in a clamped state.

However, in the embodiments of the 3D bending device 46 according to FIG. 8 and FIG. 10, the input parameters first torsion angle α1, second torsion angle α2, starting distance s0 of the legs 12, 14 and final distance s of the legs 12, 14 can be implemented directly. Moreover, the supervision of the shaping of the free-form bent portion over the course of the bend is possible.

By adapting the parameters in a more targeted manner, the 3D bending process can be considered more independently of the 2D bending process. This simplifies the commissioning because fewer iteration steps have to be carried out when determining the parameters. In an embodiment according to FIG. 11, the distance of the legs 12, 14 could not be made smaller without changing the torsion angles α1, α2 of the legs 12, 14.

Due to the degrees of freedom gained, the desired wire shape can be shaped more uniformly. In the embodiment according to FIG. 11, a forced position of the legs 12, 14 and the roof shape resulted from the angular position. In many cases, an additional bending of the roof was required in order to obtain the desired pin shape/wire shape.

The decoupling of the leg torsion and the relative position of the legs relative to each other, which is provided in the embodiments according to the invention of the 3D bending device 46, also permits more complex free-form bent portions. For example, outputs for different phases of the electric machine with different angles can thus be obtained.

In order to simplify the commissioning and parameter change in a 3D bending process of wires, the invention thus provides a 3D bending device 46 and a 3D bending method for bending a wire 10, in which the wire 10 is held by a first leg 12 and a second leg 14 and the legs 12, 14 are moved, by means of a first to third relative movement device 54, 56, 58, in a first to third relative movement with a first to third movement axis 64, 66, 68 in order to change, in an adjustable manner independently of one another, torsion angles α1, α2 of the first and second legs 12, 14 and a distance s0, s between the central axes of the legs 12, 14. In other words, the legs 12, 14 of the wire 10 are movable relative to each other with at least three degrees of freedom in the 3D bending device and in the 3D bending method.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS

10 Wire
12 First leg
14 Second leg
16 Angled portion
18 Roof-shaped bent portion
20 First roof shape leg
22 Second roof shape leg
24 Cranked portion
26 Stator sheet pack
28 Stator
30 Groove
32 Hairpin
34 I-pin
36 Offset bent portion
38 First angle (angled portion)
40 Second angle (angled portion)
42 Third angle (angled portion)
44 3D bending
46 3D bending device
48 Imaginary connecting line
50 First holding member
52 Second holding member
54 First relative movement device
56 Second relative movement device
58 Third relative movement device
60 First gripper
62 Second gripper
64 First movement axis
66 Second movement axis
68 Third movement axis
70 Bending unit (stationary leg)
72 Machine frame
74 First gripper jaws
76 Second gripper jaws
78 Actuator (gripper)
80 Cross slide
82 First linear movement device (first linear movement axis x)
84 Second linear movement device (second linear movement axis y)
86 First guiding device
88 First slide member
90 First linear movement actuator
92 Second guiding device
94 Second slide member
96 Second linear movement actuator
98 First rotating or pivoting device
100 First rotation or pivot axis
102 First rotary actuator
104 Base member
106 Control system
108 Bending unit (two movable legs)
110 Second rotating or pivoting device
112 Second rotation or pivot axis
114 Second rotary actuator
$\alpha_1$ Torsion angle first leg
$\alpha_2$ Torsion angle second leg $P_0$ Position in initial state
$K_0$ Radius with distance of the legs in initial state
$K_1$ Radius with distance of the legs in final state
$K_2$ Curve of free-form portion
$s_0$ Distance of legs (initial state)
$s$ Distance of legs (final state)
x First linear movement axis
y Second linear movement axis

The invention claimed is:

1. A 3D bending device for bending a wire, which is formed with a first leg, a second leg and an angled portion between the legs, into a 3-dimensional shape for production of machine elements of electric machines, comprising:
   a first holding member configured to hold the wire by the first leg and a second holding member configured to hold the wire by the second leg,
   a first relative movement device configured to relatively move the first holding member and the second holding member in a first relative movement with a first movement axis to produce a first torsion angle of the first leg relative to an imaginary connecting line between central axes of the legs,
   a second relative movement device configured to relatively move the first holding member and the second holding member in a second relative movement with a second movement axis to produce a second torsion angle of the second leg relative to the imaginary connecting line between the central axes of the legs,
   a third relative movement device configured to move the first holding member relative to the second holding member in a third relative movement with a third movement axis to change a distance between the central axes of the legs, and,
   a control system comprising instructions configured for controlling the 3D bending device in order to carry out a 3D bending method for bending the wire into the 3-dimensional shape for production of machine elements by electric machines by:
   a) twisting the first leg by the torsion angle relative to the imaginary connecting line between central axes of the first and the second leg by the first relative movement of the first leg and the second leg with the first movement axis,
   b) twisting the second leg by the second torsion angle relative to the imaginary connecting line between the central axes of the first and the second leg by the second relative movement of the first leg and the second leg with a second movement axis, and
   c) changing the distance between the central axes of the first and the second leg by the third relative movement of the first and the second leg with the third movement axis.

2. The 3D bending device according to claim 1, wherein the first relative movement device is a first rotating or pivoting device to rotate or pivot the first holding member about a first rotation or pivot axis as the first movement axis.

3. The 3D bending device according to claim 1, wherein the third relative movement device is a linear movement device configured to relatively move the first holding member and the second holding member in a direction of a first linear movement axis as the third movement axis.

4. The 3D bending device according to claim 1, wherein at least one of
   the second holding member is stationary and the first holding member is configured to be movable by means of the first to third relative movement devices, or
   the second relative movement device is a linear movement device configured to move the first holding member in a direction of a second linear movement axis as the second movement axis.

5. The 3D bending device according to claim 1, wherein the second relative movement device is a second rotating or pivoting device configured to rotate or pivot the second holding member about a second rotation or pivot axis as the second movement axis.

6. The 3D bending device according to claim 5, wherein at least one of
   with at least one directional component, a rotation or pivot axis extends parallel to the central axis of at least one of the first or second leg during the use as intended of an associated holding member,
   with at least one directional axis, a linear movement axis extends transversely to the central axis of at least one of the first or second leg during use of the associated holding member,
   with at least one directional component, a first linear movement axis extends perpendicularly to a second linear movement axis, or
   a first rotation or pivot axis extends substantially parallel to a second rotation or pivot axis.

* * * * *